United States Patent [19]

Miyoshi

[11] Patent Number: 4,730,839
[45] Date of Patent: Mar. 15, 1988

[54] FOUR-WHEEL STEERING APPARATUS FOR VEHICLES

[75] Inventor: Akihiko Miyoshi, Hiroshima, Japan

[73] Assignee: Mazda Motor Corporation, Hiroshima, Japan

[21] Appl. No.: 10,781

[22] Filed: Feb. 4, 1987

[30] Foreign Application Priority Data

Feb. 7, 1986 [JP] Japan .................................. 61-24059

[51] Int. Cl.[4] ........................... B62D 5/00; B62D 7/00
[52] U.S. Cl. ........................................ 280/91; 180/143
[58] Field of Search ................... 280/91; 180/143, 141, 180/142

[56] References Cited

U.S. PATENT DOCUMENTS

| | | | |
|---|---|---|---|
| 4,483,547 | 11/1984 | Furukawa et al. | 280/91 |
| 4,621,702 | 11/1986 | Kanazawa et al. | 280/91 |
| 4,621,823 | 11/1986 | Sano | 280/91 |
| 4,647,057 | 3/1987 | Furukawa et al. | 280/91 |
| 4,660,844 | 4/1987 | Yamamoto et al. | 280/91 |

Primary Examiner—Richard A. Bertsch
Attorney, Agent, or Firm—Wegner & Bretschneider

[57] ABSTRACT

The rear wheels of a vehicle are turned together with the front wheels in response to the operation of a steering wheel. Turning ratio changing means is provided so as to be able to change a turning ratio of the rear wheels to the front wheels. In altering the turning ratio, a speed of changing the turning ratio is designed to get delayed when the turning ratio is changed in the reverse phase direction as compared with when the turning ratio is changed in the same phase direction.

19 Claims, 15 Drawing Figures

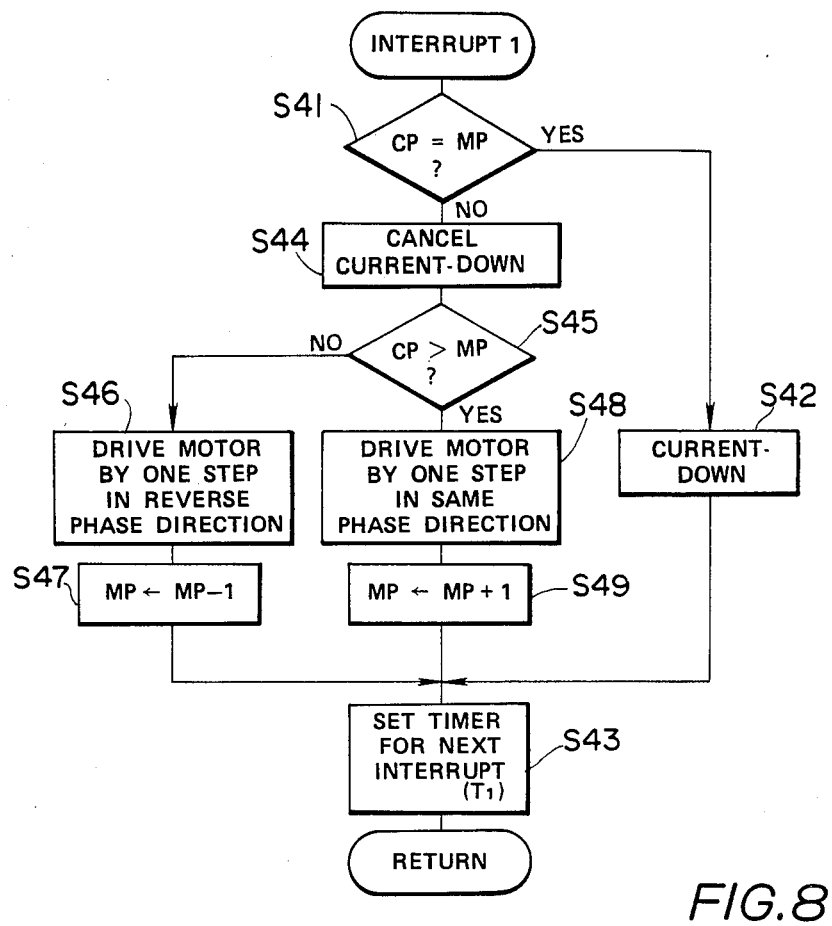
FIG. 6
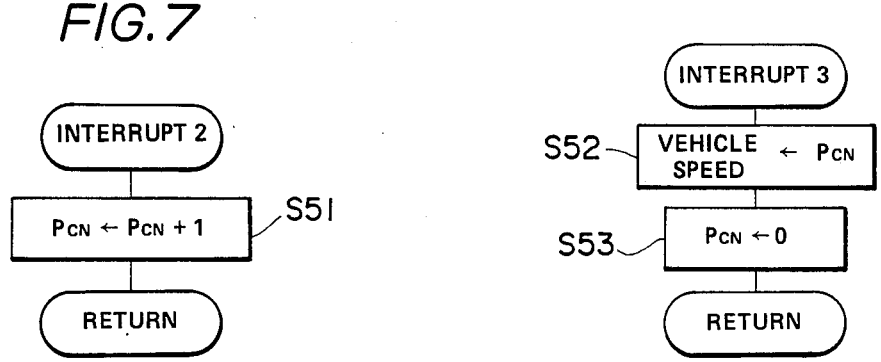
FIG. 7
FIG. 8

FOUR-WHEEL STEERING APPARATUS FOR VEHICLES

BACKGROUND OF THE INVENTION

1. Field of the Invention

The present invention relates to a four-wheel steering apparatus for vehicles and, more particularly, to a four-wheel steering apparatus for vehicles adapted to change a turning ratio of the rear wheels to the front wheels.

2. Description of the Prior Art

A four-wheel steering apparatus for a vehicle designed to turn the rear wheels in association with the front wheels in response to the operation of a steering wheel by an operator includes a front wheel turning mechanism and a rear wheel turning mechanism, and a steering angle of the steering wheel is arranged so as to be transmitted through the both turning mechanisms to the front wheels and the rear wheels as a turning angle. The steering angle of the steering wheel may be transmitted to the rear wheel turning mechanism by way of various means such as mechanical, electrical, fluid ones or a combination therewith.

In the four-wheel steering apparatus, a turning ratio of the rear wheels to the front wheels (that is, a ratio of a turning angle of the rear wheels to that of the front wheels) is not always constant and is commonly variable on the basis of a predetermined turning ratio characteristics. the turning ratio characteristics is set using a running state of the vehicle as a parameter. The parameters may include, for instance, a vehicle speed, the steering angle of a steering wheel, and a transverse G (an acceleration in the transverse direction) acting on the vehicle. U.S. Pat. No. 4,313,514 discloses the turning ratio characteristics set on the basis of vehicle speeds.

The turning ratio characteristics is not necessarily limited to one kind. A plurality of turning ratio characeristics may be set and one of them may be selected by a manual selection or the like. U.K. Patent Publication No. 2,152,452 discloses delay means for changing turning ratios gradually in selecting the turning ratio characteristics.

The direction in which the rear wheels are turned may be determined by a so-called same phase direction and a so-called reverse phase direction. The turning in the same phase direction is defined here, on the one hand, as the turning of the rear wheels in the direction identical to the direction in which the front wheels are turned. The turning of the rear wheels in the reverse phase direction is defined here, on the other hand, as the turning of the rear wheels in the direction opposite to the direction in which the front wheels are turned. Accordingly, in instances where a turning ratio is altered from one state to another, a changing direction being in the same phase direction, on the one hand, means that the direction in which the rear wheels are turned approaches to the direction in which the front wheels are turned. For example, where the front wheels are turned left, the rear wheels are also turned in the left-hand direction from the existing position. A changing direction being in the reverse phase direction, on the other, means that the direction in which the rear wheels are turned is parting from the direction in which the front wheels are turned. For instance, where the front wheels are turned left, the reara wheels are turned in the right-hand direction from the existing position. And a direction for changing the turning ratio has nothing to do with an existing state in which the rear wheels are turned, that is, the state in which the turning state is currently in the same phase or in the reverse phase. More specifically, assuming the existing state than the front wheels are turned left while the rear wheels are turned right, the state in which the rear wheels are turned left from the existing state is called an alteration of the turning ratio in the same phase direction and the state in which the rear wheels are turned farther right therefrom is called an alteration of the turning ratio in the reverse phase direction.

The alteration of the turning ratio in the same phase direction, on the one hand, causes the vehicle to stay in a stabler state while the capability of turning the vehicle head is decreased. The alteration of the turning ratio in the reverse phase direction, on the other, improves the capability of turning the vehicle head while impairing the stability of the vehicle. For these reasons, the turning ratio characteristics is set so as to harmonize the vehicle head turning capability and the vehicle stability in an optimum manner. For instance, where the turning ratio characteristics is set using vehicle speeds as a parameter, the turning ratio characterisics is set so as to allow the turning ratio to be changed farther in the same phase direction as vehicle speeds get higher from the viewpoint of ensuring the vehicle stability during the time of travelling at high speeds as well as the vehicle head turning capability during the time of travelling at low speeds, as disclosed in U.S. Pat. No. 4,313,514.

Extensive studies have been made to put the four-wheel steering apparatus into practice. As a result, it has been found that a rate of speeds at which the turning ratio is changed lies one of the points for commercialization.

Heretofore, a speed of changing the turning ratio has been set so as to be equal in both instances where the turning ratio is changed in the same phase direction and where the turning ratio is changed in the reverse phase direction. Therefore, if the speed of changing the turning ratio in the same phase direction is set to get higher from the viewpont of ensuring the vehicle stability faster, the vehicle stability will be impaired radically in changing the turning ratio in the reverse phase direction. On the contrary, if a speed of changing the turning ratio in the reverse phase direction is set so as to get delayed in order not to impair the vehicle stability radically, that is, in order for an operator (driver) to adequately cope with an alteration of the vehicle in an unstable direction, it may be delayed to ensure the vehicle stability in altering the turning ratio in the same phase direction.

In particular, if the turning ratio characteristics is set using vehicle speed as a parameter, as have been described above, the turning ratio is changed in accordance with acceleration or deceleration regardless of the fact that a steering wheel is not operated at all. Thus the turning ratio is changed without operation of the steering wheel because many things may occur beyond expectation of an operator. From such a point of view, too, what has been described above may cause problems. These may also be applicable to all the cases where the turning ratio is changed notwithstanding the transverse G or the like, or no operation of the steering wheel.

SUMMARY OF THE INVENTION

The present invention has object to provide a four-wheel steering apparatus for a vehicle designed to be able to alter the vehicle quickly in a stabler state and for an operator to cope with an alteration of the vehicle in an unstable state, when the turning ratios are changed.

In order to accomplish the above object, the present invention is constructed so as to delay a turning ratio changing speed when the turning ratio is changed in the reverse phase direction, as compared with when the turning ratio is changed in the same phase direction.

The present invention is constructed basically, as claimed in claim 1, so as to include changing-direction discriminating means for discriminating whether the turning ratio changing direction is in the same phase direction or in the reverse phase direction and changing-speed altering means for delaying the changing speed of the turning ratio when the turning ratio is changed in the reverse phase direction, as compared with when changed in the same phase direction.

This construction can serve as ensuring a prompt vehicle stability by immediately changing the turning ratio in the same phase direction, while it enables an operator to cope with the tendency toward a vehicle instability because the turning ratio in the reverse phase direction is changed slowly.

Preferred embodiments according to the present invention are constructed in the following manner, as illustrated by a block diagram in FIG. 1.

In a four-wheel steering apparatus for a vehicle equipped with a front wheel turning mechanism for turning the front wheels and a rear wheel turning mechanism for turning the rear wheels and designed to turn the rear wheels in association with the front wheels in response to the operation of a steering wheel, a four-wheel steering apparatus comprising of turning ratio changing means for changing a turning ratio of the rear wheel to the rear wheel; memory means for memorizing turning ratio characteristics determined in accordance with the running state of the vehicle; running state detecting means for detecting the running state of the vehicle; target turning ratio determining means for determining a target turning ratio on the basis of the turning ratio characteristics in accordance with the running state of the vehicle; turning ratio change controlling means for controlling the turning ratio changing means to become the target turning ratio; changing direction discriminating means for discriminating whether the changing direction of the turning ratio is in the same phase direction or in the reverse phase direction; and changing-speed altering means for delaying the changing speed of the turning ratio when the changing direction of the turning ratio is in the reverse phase direction, as compared with when the turning ratio is changed in the same phase direction.

As will become apparent from the description below, this construction is particularly suitable for directly controlling the changing of the turning ratio alone regardless of a turning angle of a steering wheel.

As another preferred embodiment according to the present invention, there is a construction as described by the block diagram in FIG. 11.

Such a construction is composed such that, in a four-wheel steering apparatus for a vehicle equipped with a front wheel turning mechanism for turning the front wheels and a rear wheel turning mechanism for turning the rear wheels and designed to turn the rear wheels in association with the front wheels in response to the operation of a steering wheel, a four-wheel steering apparatus comprising of an electromagnetic actuator for turning the rear wheels by driving the rear wheel turning mechanism; turning angle detecting means for detecting a turning angle of the steering wheel; target turning ratio determining means for determining a target turning ratio on the basis of a predetermined turning ratio characteristics; integrating means for integrating a signal from the target turning ratio determining means on the basis of a determined time constant; discriminating means for discriminating whether the direction of changing the turning ratio is in the same phase direction or in the reverse phase direction by comparing a signal from the target turning ratio determining means with a signal from the integrating means; time constant setting means for setting the time constant received from the discriminating means so as to become larger when the direction of changing the turning ratio is in the reverse phase direction rather than when the direction of changing the turning ratio is in the same phase direction; target turning angle determining means for determining a target turning angle of the rear wheel on the basis of outputs from the integrating means and the turning angle detecting means; and drive controlling means for controlling the actuator so as to become the target turning angle.

This construction, as will be apparent from the description below, enables the rear wheels themselves to be turned by the electromagnetic actuator driving the rear wheel turning mechanism as well as the acutuator itself to be utilized as an actuator for changing the turning ratios.

As the rear wheel turning mechanism and constructions of parts for changing the turning ratio to be used for the present invention may be used conventional ones of various type.

The present invention is particularly favorable in instances where turning ratio characteristics is set using a vehicle speed as a parameter, but is not limited thereto. Various elements known to the skilled in the art may be used as parameters to set turning ratio characteristics, and the turning ratio characteristics is not limited to one kind and it is possible to use a plurality of turning ratio characteristics in a manner capable of being selected therefrom automatically or my manual operation.

It is to be understood here that the changing of a turning ratio referred to in the present invention is not limited to the case where the turning ratio is changed on the basis of a particular turning ratio characteristics. That is, in the event where one turning ratio characteristics is selected from plural turning ratio characteristics, it is to be noted that the changing of the turning ratio arising from the changing of the selected turning ratio characteristics is included. More specifically, when the changing direction of a turning ratio accompanied with an alteration of turning ratio characteristics is in the same turning direction, on the one hand, a speed of changing a turning ratio is designed so as to get faster and, when it is in the reverse phase direction, a speed of changing a turning ratio is delayed.

The changing of speeds of changing a turning ratio may be conducted in various manner. For example, a speed itself for operating an actuator for changing turning ratios may be changed. In the case where such an integral treatment as have been described above is utilized a speed of changing the turning ratio may be changed by interposing appropriate delaying means between an input portion of a control system for controlling the actuator and an output portion thereof.

Other objects and advantages of the present invention will become apparent during a course of the following descriptions.

BRIEF DESCRIPTION OF THE DRAWINGS:

FIGS. 5 to 10 are each a flow chart illustrating an example of a control system according to the present invention.

DETAILED DESCRIPTION OF THE PREFERRED EMBODIMENT

Embodiments of the present invention will be described more in detail with references to drawings attached hereto.

Figure 1:
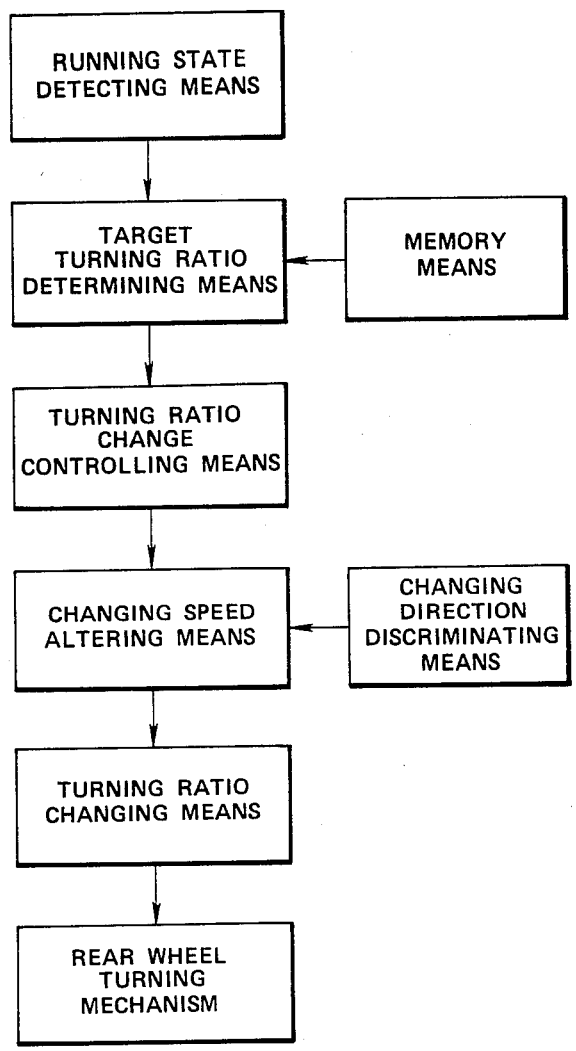
FIG. 1 is a block diagram illustrating a preferred example of constructions according to the present invention.
Figure 2:
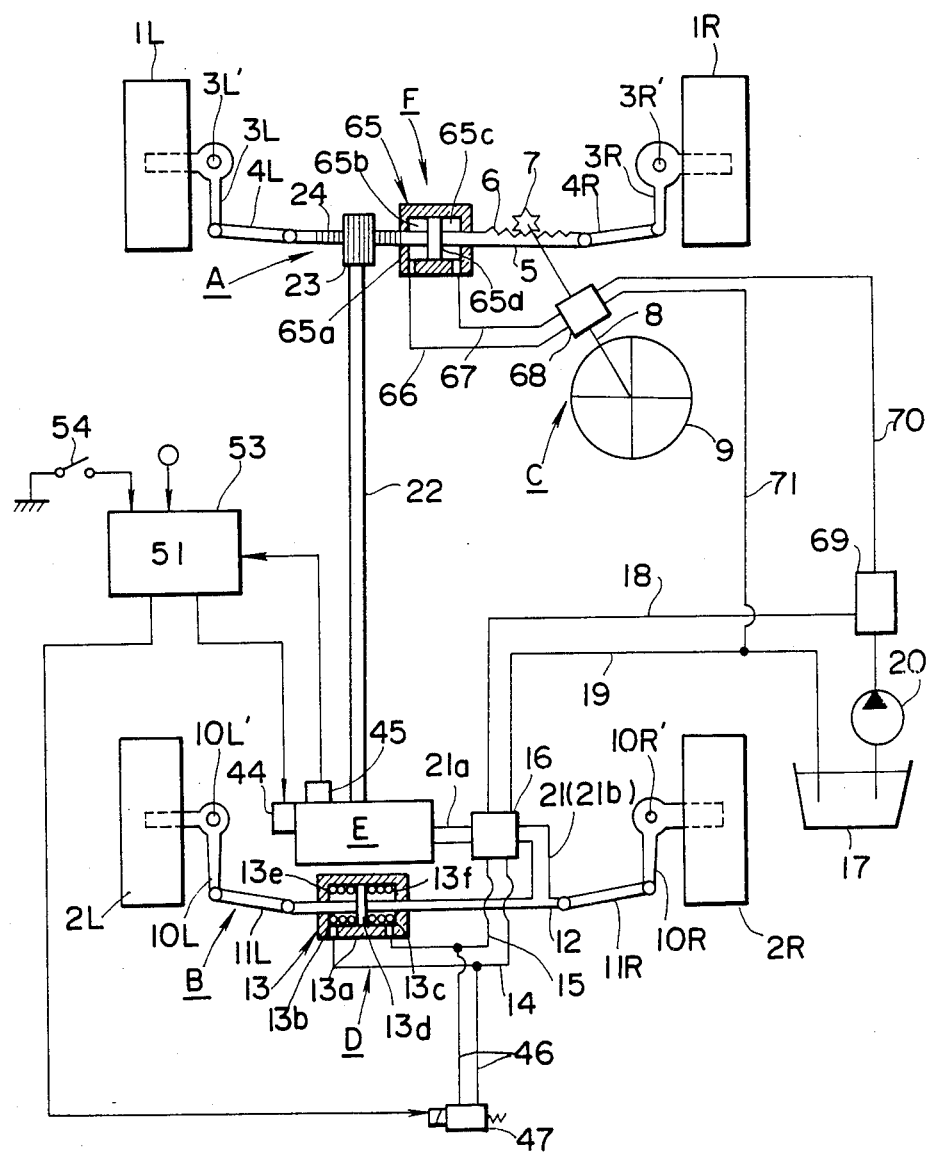
FIG. 2 is a plane view illustrating an embodiment according to the present invention.

In FIG. 2 reference numerals 1R and 1L, denote right and light front wheels, respectively, and reference numerals 2R and 2L denote right and left rear wheels, respectively. The right front wheel 1R and the left front wheel 1L are associated with a front wheel turning mechanism A, and the right rear wheel 2R and the left rear wheel 2L are associated with a rear wheel turning mechanism B.

In the illustrated embodiment, the front wheel turning mechanism A is composed of right and left knuckle arms 3R and 3L, right and left tie rods 4R and 4L, and a relay rod 5 that connects the right and left tie rods 4R and 4L to each other, respectively. The front wheel turning mechanism A is associated with a steering mechanism C that is of a rack-and-pinion type in this particular embodiment. That is, the relay rod 5 is provided with a rack 6 so as to be in mesh with a pinion 7 that in turn is connected through a shaft 8 to a steering wheel 9. When the steering wheel 9 is turned right, on the one hand, the relay rod 5 is moved left in FIG. 2 to clockwisely rotate the right and left knuckle arms 3R and 3L about their respective pivotal centers 3R' and 3L', thereby turning the front wheels in the clockwise direction by an amount correpsonding to a turning angle of the steering wheel 9. when the steering wheel 9 is turned left, on the other, the front wheels 1R and 1L are turned in the counterclockwise direction in accordance with an amount corresponding turning angle of the steering wheel in a similar manner.

The rear wheel turning mechanism B is composed of right and left knuckle arms 10R and 10L, right and left tie rods 11R and 11L, and a relay rod 12 that connects the tie rods 11R and 11L to each other, respectively. In this embodiment, the rear wheel turning mechanism B is provided with a power steering mechanism D of the hydraulic type. In the power steering mechanism D, the relay rod 12 is mounted with a cylinder device 13 in which the cylinder 13a is fixed to the vehicle body. And the relay rod 12 is provided integrally with a piston 13d dividing the cylinder 13a into a pair of compartments 13b and 13c that in turn are connected through pipes 14 and 15, respectively, to a control valve 16. To the control valve 16 are connected pipes 18 and 19 extending each from a reservoir tank 17. To the pipe 18 that forms an oil feed line is connected an oil pump 20 that is driven by the engine of the vehicle (not shown). Tthe control valve 16 is of a so-called booster valve type (spool type) in which the control rod 21 is of the sliding type. An input member 21a of the control rod 21 is also used as a moving member of a turning ratio changing mechanism E, as will be described below, and an output member 21b of the control rod 21 is integrated to the relay rod 12 of the rear wheel turning mechanism B.

In the power steering mechanism D, when the control rod 21 is moved left in FIG. 2, the relay rod 12 is also moved left in FIG. 2, as is known to the skilled in the art. This causes the right and left knuckle arms 10R and 10L to rotate clockwisely in FIG. 2 about their respective pivotal centers 10R' and 10L', thereby turning right the respective rear wheels 2R and 2L. As the rear wheels are turned, oil pressure is fed to the compartment 13c of the cylinder device 13 according to a sliding amount of the control rod 21 to multiply the force acting to drive the relay rod 12. Likewise, when the control rod 21 is moved right in FIG. 2, the rear wheels 2R and 2L are turned left in accordance with the sliding amount of the control rod 21 with the force being multiplied force by oil pressure fed to the compartment 13b of the cylinder device 13.

The front wheel turning mechanism A, like the rear wheel turning mechanism B, is provided with a power steering mechanism F that includes a cylinder device 65 mounted on the relay rod 5 of the front wheel turning mechanism A, a cylinder 65a of the cylinder device 65 being fixed to the vehicle body. A piston 65d is integrated to the relay rod 5 so as to divide the cylinder 65a into a pair of compartments 65b and 65c. The compartments 65b and 65c in the cylinder 65a are connected through the respective pipes 66 and 67 to a control valve 68 of the rotative type mounted on the shaft 8 of the steering mechanism C. To the control valve 68 are connected a pipe 70 extending from a flow dividing valve 69 connected to the output side of the oil pump 20 and a pipe 71 branched off from the pipe 19.

The poewr steering mechanism F is to transmit the force of the steering wheel 9 to the relay rod 5 by multiplying the oil pressure fed to the compartments 65b and 65c of the cylinder device 65. As the action of the power steering mechanism F itself is basically the same as the power steering mechanism D described above, no more description thereon is omitted here.

The steering mechanism C is associated with the rear wheel turning mechanism B by way of the front wheel turning mechanism A and the turning ratio changing device E. An input rod 22 is extending forward from the turning ratio changing mechanism E, and a pinion 23 mounted on the front end of the input rod 22 is in mesh with a rack 24 formed on the relay rod 5 of the front wheel turning mechanism A. As an output rod of the turning ratio changing device E serves the input member 21a of the control rod 21 in the control valve 16.

An example of the turning ratio changing device E will be described with reference to FIG. 3. In the turning ratio changing device E, the input member 21a of the control rod 21 is supported so as to move slidably in the transverse direction of the vehicle body along a line 1, in FIG. 3. The turning ratio changing device E includes a swinging arm 31 that is supported at its base portion for pivotal movement by a pin 33 with respect to a holder 32. The holder 32 is supported on the vehicle body so as to be rotatable about a line $l_2$ perpendicular to the line $l_1$ along which the input member 21a is movable. The pin 33 is positioned at the intersection of the lines $l_1$ and $l_2$ and extends in the direction perpendicular to the line $l_2$. Accordingly, although the swinging arm 31 is able to swing about the pin 33, the rotation of the holder 32 varies an angle of inclination of the pin 33 with respect to the line $l_1$, i.e., an angle of inclination of an orbit plane of the swinging movement about the pin 33 with respect to a plan (reference plane) perpendicular to the line $l_1$.

The front end portion of the swinging arm 31 is connected with the input member 21a by way of a connecting rod 34. Specifically, the connecting rod 34 is connected through a ball joint 35 to the front end portion of the swinging arm 31, on the one hand, and through a ball joint 36 to the input member 21a, on the other hand.

The distance between the ball joints 35 and 36 positioned at each of the end portions of the swinging arm 31 is kept constant by the connecting rod 34. Therefore, when the ball joint 35 is moved in the left-and-right direction in FIG. 3, the input member 21a is also moved in the left-and-right direction in FIG. 3 in accordance with the movement of the ball joint 35 (36).

Swinging movement of the swinging arm 31 about the pin 33 is made according to the movement of operation of the steering mechanism C, i.e., to the turning angle of the steering wheel. For this purpose, in this embodiment, the connecting rod 34 is connected with a rotary plate 37 composed of a bevel gear. The rotary plate 37 is supported rotatively on the vehicle body so as to allow the rotary axis 37a thereof to coincide with the line $l_1$. The connecting rod 34 penetrates slidably the eccentric portion of the rotary plate 37 by way of a ball joint 38, and the rotary plate 37 composed of the bevel gear is in mesh with a bevel gear 39 that in turn is connected to the input rod 22.

The swinging arm 31 is swung by the rotary plate 37 about the pin 33 by an amount corresponding to the turning angle of the steering wheel. When the axis of the pin 33 inclines against the line $l_1$, the ball joint 35 moves in the right-and-left direction in FIG. 3, i.e., toward the line $l_1$, in response to the pivotal movement about the pin 33 and this movement is transmitted through the connecting rod 34 to the input member 21a, thereby leading to the movement of the input member 21a. And the movement of the ball joint 35 in the right-and-left direction FIG. 3 is changed to change a turning ratio when an angle of inclination of the pin 33, that is, an angle of rotation of the holder 32, is changed, even if an angle of a swinging movment of the swinging arm 31 about the pin 33 is identical.

In order to change the angle of inclination, a sector gear 40 is fixedly mounted as a worm wheel on the rotary shaft 32a of the holder 32 and is in mesh with a worm gear 41 that is rotatively driven by a step motor 44 as inclination angle changing means by way of a pair of bevel gears 42 and 43.

The following is description on impacts of the swinging angle of the swinging arm 31 about the pin 33 and the angle of inclination of the swinging arm 31 (the angle of inclination of the pin 33) on the movement of the ball joint 35 in the direction of the line $l_1$. In the following description, the swinging angle of the swinging arm 31 about the pin 33 is represented by $\theta$, the reference plane perpendicular to the line $l_1$ is represented by $\delta$, the angle of inclination of the swinging plane of the swinging arm 34 with respect to the reference plane $\delta$ is represented by $\alpha$, and the eccentric distance of the ball joint 35 from the pin 33 is represented by r. In this case, the amount of movement X of the ball joint 35 in the direction of the line $l_1$ is represented by the formula: $X = r \tan\alpha \cdot \sin\theta$ and is a function of $\alpha$ and $\theta$. Accordingly, when the angle $\alpha$ of inclination is fixed at a particular value, on the one hand, the amount of movement X depends solely upon the function of $\theta$ or the turning angle of the steering wheel. When the angle $\alpha$ of inclination is changed, on the other hand, the amount of movement X is changed even if the turning angle of the steering wheel is identical. In other words, the change of the angle $\alpha$ of inclination leads to the change of turning ratios. That is, an angle of revolution of the step motor 44 (step numbers) corresponds primarily will the turning ratio.

The mechansim of changing turning ratios itself is disclosed in Japanese Patent Early Publication No. 193,770/1985 and the corresponding U.S. Pat. No. 4,572,316. A description thereon will accordingly be omitted here.

Figure 4:
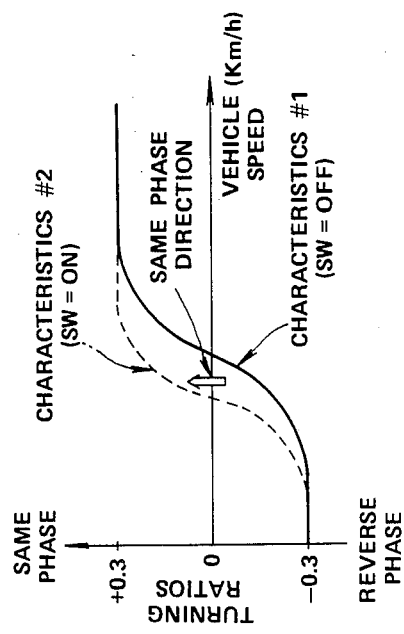
FIG. 4 is a graph illustrating a characteristic curve of turning ratio characteristics.

The turning ratios may be changed on the basis of turning ratio characteristics predetermined using a vehicle speed as a parameter, for instance, as shown in FIG. 4. The turning ratio characteristics includes a first turning ratio characteristics (hereinafter referred to as characteristics #1) and a second turning ratio characteristics (hereinafter referred to as characteristics #2) that offsets the characteristics #1 at the low speed part. The characteristics #1 and the characteristics #2 can be conveniently switched or selected from each other by a manual operation. It is needless to say that the turning ratio characteristics as demonstrated in FIG. 4 is memorized by a ROM.

Turning now back to FIG. 2, the rear wheel power steering mechanism D includes a pair of return springs 13e and 13f in order to force the rear wheels 2R and 2L at the neutral position, that is, in the state to make a straight drive. The return springs 13e and 13f are designed so as to urge the relay rod 12 for the rear wheels with equivalent forces toward the neutral position from the right and left directions. The compartments 13b and 13c of the rear wheel power steering mechanism D are connected to each other through a through passage 46 that in turn is connected with an electromagnetic on-off valve 47. When the on-off valve 47 is closed, the rear wheels 2R and 2L are turned opposite to the spring 13e or 13f with the hydraulic pressure fed to the compartment 13b or 13c, respectively. When the on-off valve 47 is open so as to keep the pressures in the compartments 13b and 13c identical to each other, the rear wheels 2R and 2L are forced at the neutral position by the action of the springs 13e and 13f. It is a matter of course that an urging force of the springs 13e and 13f should be predetermined to be large enough to be kept at the neutral position opposite to the outside force given by the rear wheel 2R or 2L, while cornering.

Figure 3:
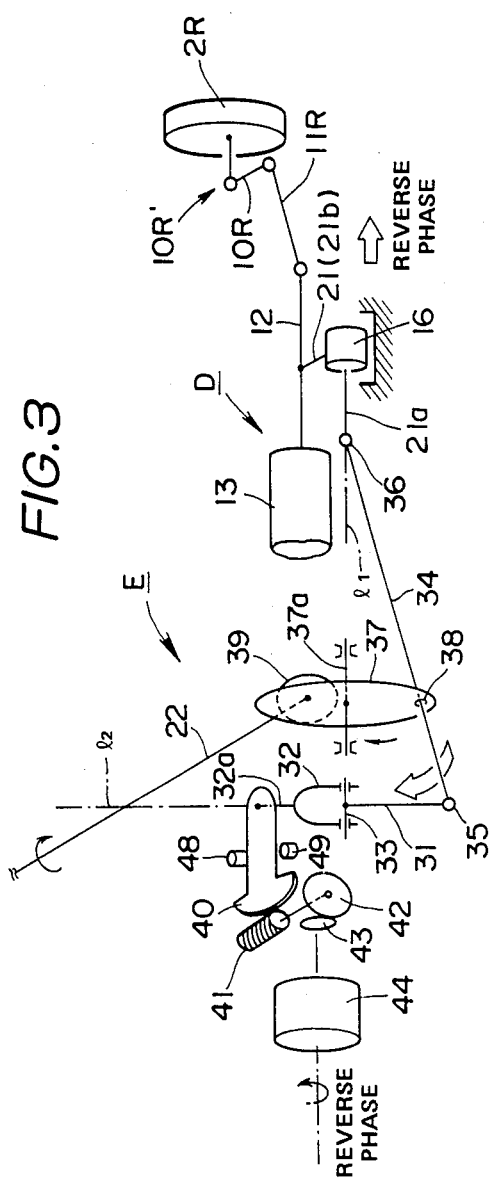
FIG. 3 is a skeletal view illustrating a portion of a turning ratio changing mechanism.

The sector gear 40 driven by the step motor 44 is arranged so as to cause both ends of swinging strokes to be controlled by a stopper 48 at the same phase part and a stopper 49 at the reverse phase part, respectively, as shown in FIG. 3. A range of rotation of the step motor 44 required over the whole range of swinging movement of the sector gear 40, i.e., from the stroke end at the same phase part to the stroke end at the reverse phase part, is 580 in the step number.

In FIG. 2, reference numeral 51 denotes a control unit constituted, for example, by a microcomputer, which is equipped basically with a CPU, a ROM, a RAM and a CLOCK. The control unit 51 is designed so as to allow signals to be input from a vehicle speed sensor 53 and ON/OFF signals to be input from a turning ratio characteristics shifting switch 54. The turning ratio characteristics shifting switch (SW) 54 constitutes characteristics shifting means for shifting turning ratio characteristics. When the switch 54 is OFF, this means the selection of the characteristics #1, on the one hand. When the switch 54 is ON, this means the selection of the characteristics #2. Signals are output from the control unit 51 to the step motor 44 and the on-off valve 47.

Control by the control unit 51 will be described more in detail with reference to flow charts as shown in FIGS. 5 to 10. Generally speaking, control is made by relatively accelerating speeds of rotation of the step motor 44 as an actuator, on the one hand, when the characteristics #1 is shifted to the characteristics #2 or when turning ratios are changed in response to acceleration, that is, when the turning ratios are changed in the same phase direction. Control is made by relatively decelerating speeds of rotation of the step motor 44, on the other hand, when the characteristics #2 is shifted to the characteristics #1 or when turning ratios are changed in response to deceleration, that is, when the turning ratios are changed in the reverse phase direction. Thus a velocity of controlling the change of turning ratios is changed by the phase direction of the change of turning ratios. As means for changing a velocity of rotation of the motor 44 is used means for changing a step driving frequency, i.e., means for changing a rate of steps to be driven per second. In this embodiment, attention is drawn to the possibility that the step number deviates from the actual step position in the step motor 44, and the registration of the reference position, i.e., the initialization of the motor position, is carried out. The initialization of the motor position is made, in this embodiment, by causing the sector gear 40 to come in touch with the stopper 49 at the reverse phase part. The position where the sector gear 40 is caused to be in touch with the stopper 49 is made the origin where the step number if "0", and a step number driven from the origin is represented by a motor position "MP" at the position where the motor is actually located. The initialization of the motor position is conducted at the time of the control start or imemdiately after the engine start and whenever the vehicle speed is made zero. Flow charts indicated in this embodiment include two kinds, one being "Flag 1" and the other being "Flag 2". Each flag has the following meaning:

Flag 1:
This flag is to distinguish whether or not the initialization of the motor position is being conducted. When the initialization is finished is represented by "0", and when the initialization is being done is represented by "1".

Flag 2:
This flag is used to carry out the initialization of the motor position only once whenever the vehicle speed is made zero from the running state. When the initialization of the motor position was done once, it is represented by "1".

Figure 5:
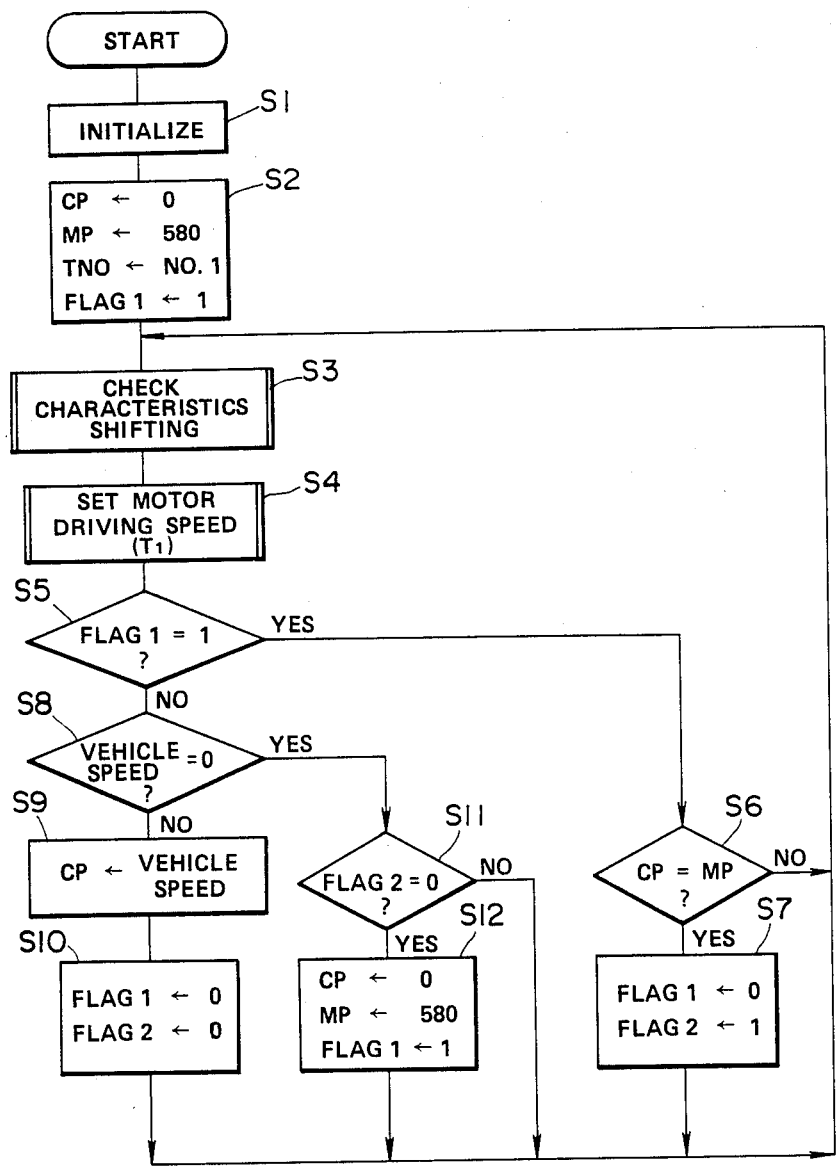

With the above premises, the present invention will be described with reference to each of the drawings in accordance with the flow charts as shown in FIGS. 5 to 9. For brevity of description, interrupt treatments as shown in FIGS. 6 to 8 for the main routine as shown in FIG. 5 will be described first. In the following description, the reference symbol "S" means step.

Interrupt Treatment 1 (FIG. 6)

The interrupt routine as shown in FIG. 6 is to drive the step motor 44 so as to match a turning ratio with a vehicle speed on the basis of the characteristics #1 or the characteristics #2. The interrupt into the main routine as shown in FIG. 5 is done at every predetermined time ($T_1$) set by a timer. In the drawing, "CP" denotes a target step number necessary to determine the turning ratio on the basis of the characteristics #1 or the characteristics #2 shown in FIG. 4, and "MP" denotes, as described above, a step number representing the swinging position of the sector gear 40 (the turning position of the rear wheels 2R and 2L) from the origin corresponding to the position of the stopper 49 at the reverse phase part.

Under the above conditions, whether or not a target step number CP corresponds to an existing position MP is discriminated in S41. If YES in S41, the rear wheels 2R and 2L are positioned at a turning angle according to the predetermined turning ratio characteristics, and the flow proceeds to S42 where electric current to be fed to the step motor 44 is decreased (current-down). After the currentdown, a timer is set in S43 at an interrupt time ($T_1$) for the next interrupt.

If the discrimination in S41 is NO, electric current to be fed to the step motor 44 is increased for driving the step motor 44 in S44, i.e., the current-down is cancelled. Then, in S45, whether or not the target step number CP is greater than the existing position MP is discriminated. The discrimination in S45 is made NO when the existing position MP of the step motor 44 is learned to the same phase side from the target step number CP. In this case, in S46, the step motor 44 is driven by one step toward the reverse phase side. Following this operation, the existing position MP is renewed by one step in S47 and the flow proceeds to S43. When it is discriminated YES in S45, the step motor 44 is driven by one step to the same phase side in S48, and the existing position MP is renewed by one step in S49 and the flow proceeds to S43.

When the step motor 44 is intended to be driven, for instance, at a driving frequency at the rate of 100 steps per second, the timer is set at 10 msec at the interrupt time ($T_1$). That is, the speed of rotation of the motor 44 is represented by $1/T_1$. The driving frequency of the motor 44 or the rotation speed thereof is designed to be changed by changing the interrupt time ($T_1$) by way of a motor driving speed setting treatment (S4 in FIGS. 5 and 10) as will be described below.

Interrupt Treatment 2 (FIG. 7)

This interrupt treatment is made as a pretreatment for the detection of vehicle speeds. A vehicle speed sensor 53 to be used here generates pulses in response to the rotation of the metering cable of a speedometer, and the interrupt into the main routine in FIG. 5 is made whenever the pulse is generated, i.e., at the rising of a pulse or at the falling thereof. As the vehicle speed sensor 53 may be used here, for example, a 20 pulse sensor designed to set the pulse number to be 20 when the metering cable is rotated by one, and the metering cable is designed to rotate by 637 revolutions at every kilometer of running. This means that the number of pulses generating for one kilometer of running becomes 12,740 pulses. Thus the pulses generated from the vehicle speed sensor 53 are counted and memorized as $P_{CN}$ in S51.

Interrupt Treatment 3 (FIG. 8)

This interrupt treatment is to design the pulse number described under the above interrupt treatment 2 (FIG. 7) to be utilized as a vehicle speed in km/h. IN this case, the interrupt into the main routine in FIG. 6 is arranged to be made at a rate of every 282,575 msec from the relationship of the vehicle speed sensor 53 set as described above and the metering cable. That is, in S52, the above value $P_{CN}$ is set as it is as a vehicle speed value (km/h) and then, in S53, the value $P_{CN}$ counted in S51 in FIG. 7 is cleared.

It is to be understood here that FIGS. 7 and 8 illustrate merely examples of vehicle speed detection and that the vehicle speed may be detected convenientry by means of conventional method.

Main Routine (FIG. 5)

In S1, the whole system is initialized, and, in S2, CP is set "0", MP is set "580", flag 1 is set "1" and a turning ratio characteristics (TNO) is set as characteristics #1. That CP is set as 0 is to return the sector gear 40 up to coming in touch with the stopper 49 at the reverse phase part by forcibly carrying out the treatment from S45 to S46, as will be apparent from the description on FIG. 6, that is, to conduct the initialization of the motor position. The MP is set as 580 is to enable the sector gear 40 to be always returned to the origin, wherever it is positioned, after getting in touch with the stopper 49 at the reverse phase part when the sector gear 40 is returned by 580 steps. That the turning ratio characteristics is set as the characteristics #1 is because the characteristics #1 is a basic characteristics for four-wheel steering.

Then whether the turning ratio characteristics shift is checked in S3 and a motor driving speed is set in S4, as will be described below. After the flow proceeds to S5, it is discriminated whether or not flag 1 is "1". In S5, the flag 1 is originally set as "1" so that, when it is discriminated as YES, the flow proceeds to S6 where it is discriminated whether or not CP=MP. If NO in S6, the flow is returned to a loop starting from S3 to S6. During the loop, the step motor 44 is driven, as in FIG. 6, so as to cause MP to approach to "0" and eventually to reach MP=CP. At the time of CP=MP, the initialization of the motor position is completed and the flag 1 is set as "0" and flag 2 is set as "1" in S7.

If No in S5, it is discriminated whetehr or not the current vehicle speed is zero in S8. If NO in S8, a target step number CP is set in S9. It is needless to say that this CP value is a value corresponding to a turning ratio determined by referring the current vehicle speed to the characteristics #1 or #2. Thereafter, in S10, both the flag 1 and the flag 2 are set each to tbe "0" and the flow returns to S3.

If YES in S8, the flow advances to S11 where it is discriminated whether the flag 2 is "0". If NO in S11, the flow returns to S3 as it is not necessary to conduct the initiarization of the motor position again because the step motor 44 is not driven after the initialization of the motor position. If YES in S11, the flow proceeds to S12 to carry out the initialization of the motor position. In S12, CP=0, MP=580 and FLag 1 is set "1" (corresponding to S2), then the initialization of the motor position is conducted through S5 and S6.

Figure 9:
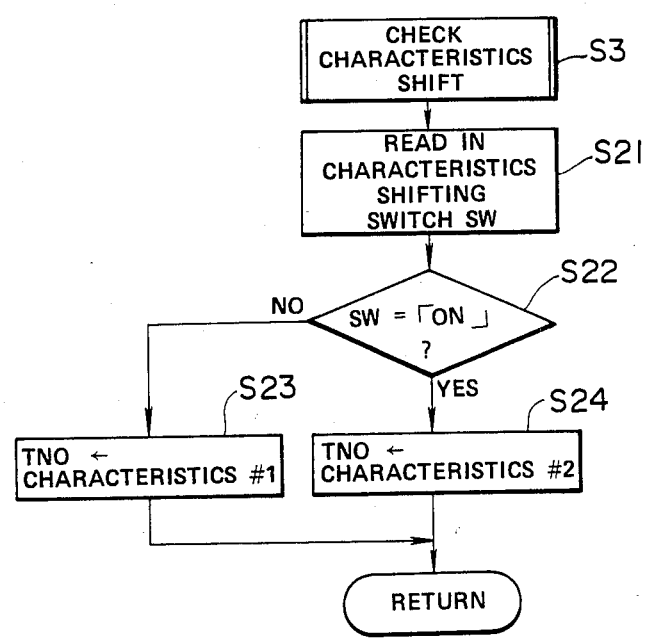

Checking of Characteristics Shift (FIG. 9)

In S21, the ON/OFF state of the characteristics shifting switch (SW) is read in. Then it is discriminated whether the characteristics shifting switch 54 is "ON" in S22. If NO in S22 or the characteristics #1 is selected, the flow advances to S23 where the turning ratio characteristics is set to be the characteristics #1. The target step number CP to be set in S9 is also designed to be based on the characteristics #1 in accordance therewith.

If YES in S22 or the characteristics #2 is selected, the flow proceeds to S24 where the turning ratio characteristics is set as the characteristics #2. In accordance therewith, the target step number CP to be set in S9 is designed to be based on the characteristics #2.

Figure 10:
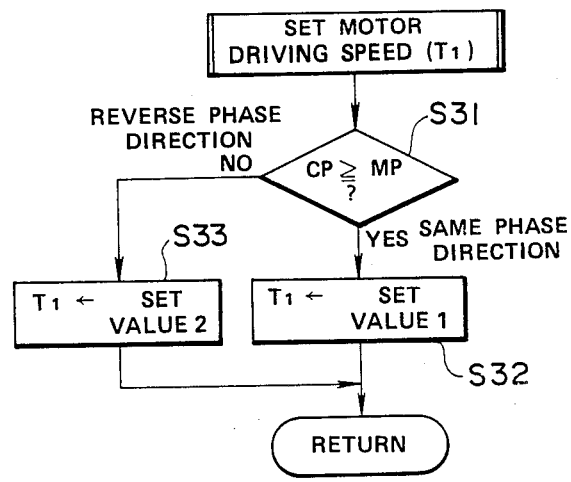

Setting of A Step Motor Driving Speed (FIG. 10)

In this embodiment, it is discriminated whether the turning ratio is altered in the same phase direction or in the reverse phase direction by comparing the existing position MP with the target step position CP, that is, by comparing the current turning ratio with the target turning ratio. When the alteration is in the same phase direction, the interrupt time $T_1$ (FIG. 6) is set as "set valve 2". When the alteration is in the reverse phase direction, the interrupt time $T_1$ is set as "set valve 2". The set valve 1 and the set valve 2 have the relationship as the set valve 1 being smaller than the set valve 2. From this relationship, the driving speed of the step motor 44 gets relatively fasater when the turning ratio is altered in the same phase direction, and the driving speed of the step motor 44 gets relatively slower when it is altered in the reverse phase direction. Thus, speeds of controlling the alteration of the turning ratio followed by the alteration of the rear wheel turning ratio vary with when in the same phase direction and when in the reverse phase direction.

In S31, it is discriminated whether the target step position CP is larger than the existing step position MP. Of course, the exising step position MP is memorized in a random manner and renewed to read a new value. If YES in S31, the turning ratio is changed in the same phase direction so that the interrupt time $T_1$ is set, in S32, to be a set value 1 that is a relatively short time. On the contrary, if NO in S31, the turning ratio is changed in the reverse phase direction so that the interrupt time $T_1$ is set, in S33, to be a set value $T_2$ that is a relatively long time.

In this embodiments according to the present invention, the afteration of the turning ratio in the same phase direction includes an alteration of characteristics by way of the ON/OFF shift with the shifting switch 44 (FIG. 9) and by way of an acceleration or deceleration of a vehicle. That is, as shown in FIG. 4, in instances where the characteristics #1 is shifted to the characteristics #2, on the one hand, the turning ratio is changed in the same phase direction as indicated in the direction of the arrow in the drawing. In instances where the characteristics #2 is shifted to the characteristics #1, on the other hand, the turning ratio is changed in the reverse phase direction. If identical turning ratio characteristics are used, both the characteristics #1 and the characteristics #2 are set such that the turning ratio is relatively in the same phase direction when the vehicle speed gets higher. Accordingly, the turning ratio is changed in the same phase direction in an accelerated state and in the reverse phase direction in a decelerated state.

Thus, in this embodiment, the turning of the rear wheels in the same phase direction that brings the vehicle in a stable state is effected swiftly, while the turning thereof in the reverse phase direction that enables the vehicle head to move rapidly is effected relatively slowly, thereby improving a running stability of the vehicle. Even if a situation could occur in which the vehicle speed is detected as zero on account of troubles on a vehicle sensor 53, the turning in the reverse phase direction is effected so relatively slowly that a rapid variation in movement of the vehicle can be prevented, thereby functioning also as a safety measure in case of troubles.

Figure 11:
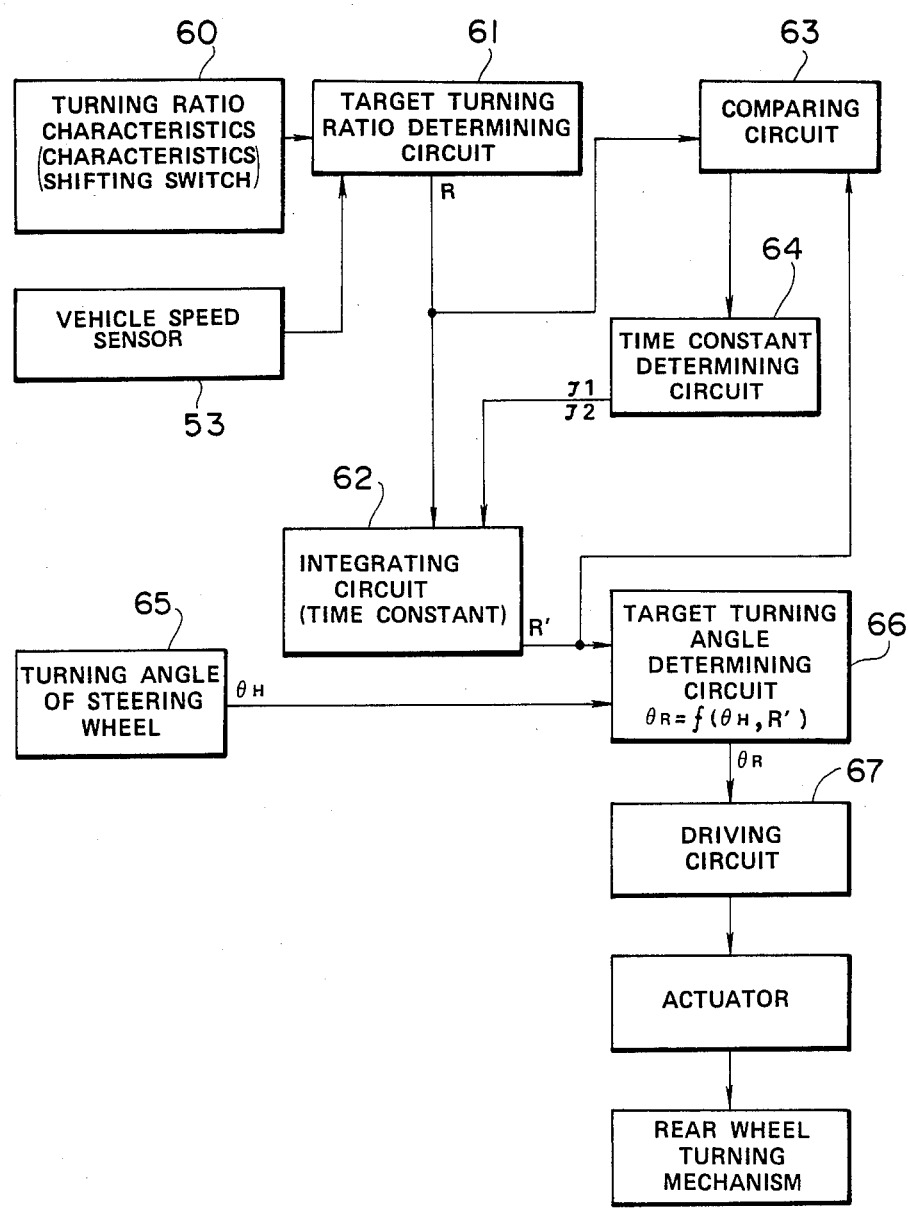
FIGS. 11 to 15 are each a graph illustrating a variation in turning ratio characteristics.

Second Embodiment (FIG. 11)

This embodiment according to the present invention represents an example where the rear wheel turning angle is determined directly on the basis fo the turning angle ($\theta_H$) of a steering wheel and the vehicle speed. In this case, for example, the control rod 21a as illustrated in FIGS. 2 and 3 is mounted directly on an actuator for the rear wheel turning that is driven in such a manner that the actuator is driven and controlled so as to be positioned at a target position (a target turning position of the rear wheels) that is determined using the turning angle ($\theta_H$) of the steering wheel and a vehicle speed as parameters. The turning angle ($\theta_H$) of the steering wheel may be detected direclty or indirectly, for example, by way of the transverse G acting on the vehicle body.

More specifically, in this embodiment, a first target turning ratio to be changed in accordance with the shift of turning ratio characteristics (selection of the characteristics #1 or #2) is integrated and an integrating time constant $\tau$ in the integral treatment is changed in accordance with the direction of changing the turning ratio, thereby adjusting a speed of outputting a signal of a second target turning ratio to be used for controlling the turning ratio and consequently adjusting a speed of controlling a variation in the turning ratios.

That is, as shown in FIG. 11, another embodiment of a control unit to be used according to the present invention includes a target turning ratio determining circuit 61 for determining the first target turning ratio R on the basis of a selected predetermined turning ratio characteristics (characteristics #1 or #2) in response to a signal from turning ratio characteristics selecting means 60 consisting of the characteristics shifting switch 54 and the vehicle speed sensor 53. The first target turning ratio R is then integrated by an integrating circuit 62 to give a second target turning ratio R', and the first and second target turning ratios R and R', respectively, are input to a comparing circuit 63. This comparing circuit 63 distinguishes the phase direction in which the turning ratio is changed by comparing the first target turning ratio R with the second one R' and outputs the distinguished result to a time constant determining circuit 64. In the time constant determining circuit 64, an integral time constant $\tau_1$ is set when the turning ratio is changed in the same phase direction, and an integral time constant $\tau_2$ is set when it is changed in the reverse phase direction. The signal of the second target turning ratio R' from the integrating circuit 62 and a signal of the turning angle ($\theta_H$) of the steering wheel from the steering wheel turning angle ($\theta_H$) sensor 65 are input to an arithmetic circuit 66 for calibrating a controlling target position (target turning position) of the rear wheels. A driving circuit 67 receiving an signal of the controlling target position from the arithmetic circuit 66 drives and controls the actuator for turning the rear wheels so as to be positioned at the target position. It is also understood that integrated time constant $\tau_1$ and $\tau_2$ set by the time constant determining circuit 64 have the relationship of $\tau_1 < \tau_2$. From this relationship, when the turning ratio is changed in the reverse phase direction, it is adjusted such that the signal of the second target turning ratio R' is output in a relatively slow manner so as to relatively delay a speed of controlling the alternation of turning ratios.

As turning ratio characteristics to be used in condition with the present invention may be set various ones, for example, as illustrated in FIGS. 12 to 15.

Figure 12:
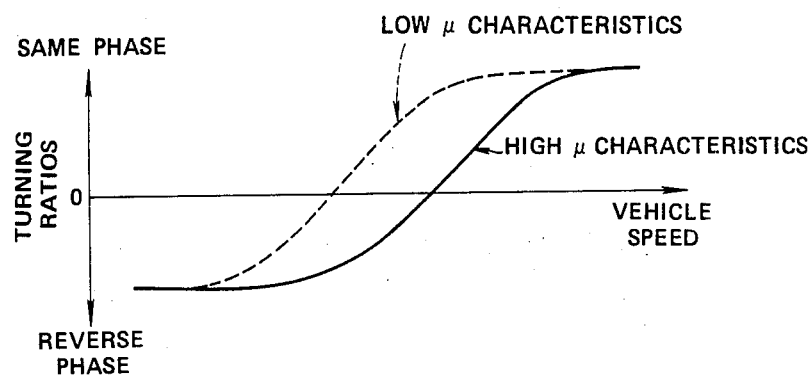

FIG. 12 indicates a first turning ratio characteristics represented by the solid line and a second turning ratio characteristics represented by the broken line. The both turning ratio characteristics use vehicle speeds each as a parameter and are set as characteristics different from each other in accordance with a friction coefficient ($\mu$) of a road surface. The two turning ratio characteristics may be selected manually or automatically in accordance with an output from a sensor for detecting the friction coefficient thereof.

Figure 13:
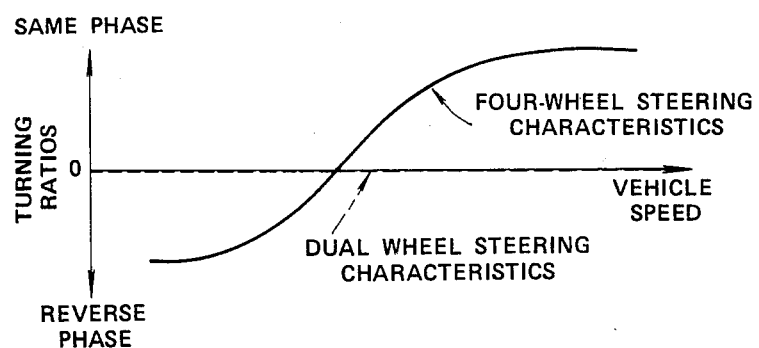

FIG. 13 indicates a first turning ratio characteristics represented by the solid line and a second turning ratio characteristics represented by the broken line. The first turning ratio characteristics is set using a vehicle speed as a parameter, and the second turning ratio characteristics is set as the turning ratio being always zero (turning the front wheels alone without turning the rear wheels). It is preferred in this case to select the turning ratio characteristics manually.

Figure 14:
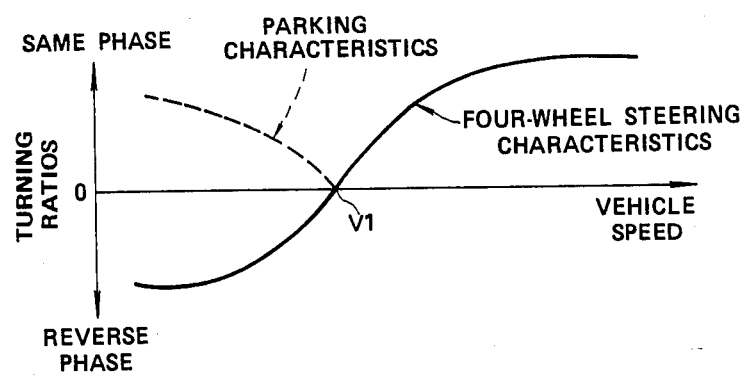

FIG. 14 indicates a first turning ratio characteristics represented by the solid line and a second turning ratio characteristics represented by the broken line, and the both are set using a vehicle speed as a parameter. The first turning ratio characteristics is set so as to cause the turning ratio to be changed farther in the same phase direction as the vehicle speed gets higher, as have been generally adopted when the vehicle speed is used as a parameter. The second turning ratio characteristics is set so as to cause the turning ratio to be shifted farther in the same phase direction as the vehicle speed is far away from a predetermined vehicle speed V1. The second turning ratio characteristics is favorable when a vehicle is parked in a place where there are only narrow spaces before and after the vehicle body (because the vehicle speed is small when being parked). A selection of the turning ratio characteristics in this case is preferably done by a manual operation.

Figure 15:
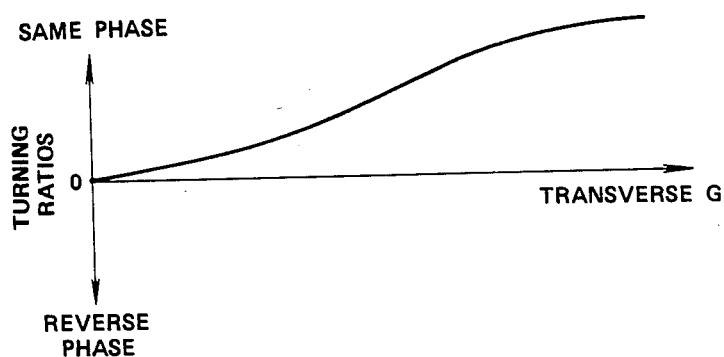

FIG. 15 indicates an example where the turning ratio is set using the transverse G as a parameter.

As an actuator for changing turning ratios may be selected an appropriate one from a step motor, other DC motors and so on. Where the control unit 51 is constituted by a computer, it may be of the digital type or of the analog type.

It is here to be understood that the present invention is not in any way restricted to the embodiments and examples as described above and contains any and various variations described herein as being included within the claims and within the spirit of the present invention.

What is claimed is:

1. In a four-wheel steering apparatus for a vehicle equipped with a front wheel turning mechanism for turning the front wheels and a rear wheel turning mechanism for turning the rear wheels and designed to turn the rear wheels in association with the front wheels in response to the operation of a steering wheel, a four-wheel steering apparatus comprising:

turning ratio changing means for changing a turning ratio of a turning angle of the rear wheel to that of the front wheel;

changing direction discriminating means for determining whether the turning ratio is changed in the same phase direction or in the reverse phase direction; and changing-speed altering means for delaying a speed of changing the turning ratio when the turning ratio is changed in the reverse phase direction, as compared with when the turning ratio is changed in the same phase direction in response to an output from said changing direction discriminating means.

2. In a four-wheel steering apparatus for a vehicle equipped with a front wheel turning mechanism for turning the front wheels and a rear wheel turning mechanism for the turning the rear wheels and designed to turn the rear wheels in association with the front wheels in response to the operation of a steering wheel, a four-wheel steering apparatus comprising of:

turning ratio changing means for changing a turning ratio of a turning angle of the rear wheel to that of the rear wheel;

memory means for meomrizing turning ratio characteristics predetermined in accordance with the running state of the vehicle;

running state detecting means for detecting the running state of the vehicle;

target turning ratio determining means for determining a target turning rartio on the basis of the turning ratio characteristics in accordance with the running state of the vehicle;

turning ratio change controlling means for controlling the turning ratio changing means to become the target turning ratio;

changing direction discriminating means for discriminating whether the changing direction of the turning ratio is in the same phase direction or in the reverse phase direction; and changing speed altering means for delaying the changing speed of the turning ratio when the changing direction of the turning ratio is in the reverse phase direction, as compared with when the turning ratio is changed in the same phase direction.

3. The four-wheel steering apparatus according to claim 2, wherein the turning ratio characteristics is set using a vehicle speed as a parameter.

4. The four-wheel steering apparatus according to claim 3, wherein the turning ratio characteristics is set using a vehicle speed as a parameter and so as to cause the turning ratio to be changed farther in the same phase direction as the vehicle speed gets higher.

5. The four-wheel steering apparatus according to claim 2, wherein the memory means memorizes a plurality of turning ratio characteristics;

turning ratio characteristics selecting means for selecting one turning ratio characteristics from the plural turning ratio characteristics is further provided therein; and the target turning ratio determining means is designed so as to determine the target turning ratio on basis of the turning ratio characteristics selected by the turning ratio characteristics selecting means.

6. The four-wheel steering apparatus according to claim 5, wherein the plural turning ratio characteristics are set each using a vehicle speed as a parameter; and the turning ratio characteristics selecting means is constituted by a manually operable switch.

7. The four-wheel steering apparatus according to claim 6, wherein the turning ratio characteristics is set using a vehicle speed as a parameter and so as to cause the turning ratio to be changed farther in the same phase direction as the vehicle speed gets higher.

8. The four-wheel steering apparatus according to claim 5, wherein the plural turning ratio characteristics are set each using a vehicle speed as a parameter so as to become characteristics different from each other in accordance with a friction coefficient of a road surface.

9. The four-wheel steering apparatus according to claim 8, wherein the turning ratio characteristics is set using a vehicle speed as a parameter and so as to cause the turning ratio to be changed farther in the same phase direction as the vehicle speed gets higher.

10. The four-wheel steering apparatus according to claim 5, wherein the plural turning ratio characteristics includes a first turning ratio characteristics and a second turning ratio characteristics;

the first turning ratio characteristics is set using a vehicle speed as a parameter; and the second turning ratio characteristics is set so as to cause the rear wheel turning ratio to become always zero.

11. The four-wheel steering apparatus according to claim 10, wherein the turning ratio characteristics is set using a vehicle speed as a parameter and so as to cause the turning ratio to be changed farther in the same phase direction as the vehicle speed gets higher.

12. The four-wheel steering apparatus according to claim 5, wherein the plural turning ratio characteristics includes a first turning ratio characteristics and a second turning ratio characteristics;

the first turning ratio characteristics is set so as to cause the turning ratio to be changed farther in the same phase direction as a vehicle speed gets higher; and the second turning ratio characteristics is set so as to cause the turning ratio to be changed farther in the same phase direction as a vehicle speed is far away from a predetermined vehicle speed.

13. The four-wheel steering apparatus according to claim 2, wherein the turning ratio characteristics is set using the transverse G acting on the vehicle body as a parameter and so as to cause the turning ratio to be changed farther in the same phase direction as the transverse G gets larger.

14. The four-wheel steering apparatus according to claim 2, wherein the turning ratio changing means includes a turning ratio changing mechanism for changing a turning angle of the rear wheel with respect to a turning angle of the steering wheel interposed between the steering wheel and the rear wheel turning mechanism and an electromagnetic actuator operating the turning raio changing mechanism.

15. The four-wheel steering apparatus according to claim 14, wherein the actuator is step motor.

16. The four-wheel steering apparatus according to claim 15, wherein the discriminating means for discriminating the direction of changing the turning ratio is designed so as to discriminate the changing directin of the turning raio by comparing the step number indicating the existing positio of the step motor with target step number determined by the target turning ratio determining means.

17. The four-wheel steering apparaus according to claim 15, wherein the changing speed altering means is constituted by changing a frequency of driving pulses for the step motor.

18. The four-wheel steering apparatus according to claim 17, wherein the turning ratio change controlling means outputs to the step mtotor by one driving pulse at every predetermined cycle;

the changing speed altering means is designed so as to change the predetermined cycle in accordance with the direction of changing the turning ratio.

19. In a four-wheel steering apparatus for a vehicle equipped with a front wheel turning mechanism for turning the front wheels and a rear wheel turning mechanism for turning the rear wheels and designed to turn the rear whels in association with the front wheels in response to the operation of a steering wheel, a four-wheel steering apparatus comprising of:

an electromagnetic actuator for turning the rear wheels by driving the rear wheel trning mechanism;

turning angle detecting means for detecting a turning angle of the steering wheel;

target turning ratio determining means for determining a target turning ratio on the basis of a predetermined turning ratio characteristics;

integrating means for integrating a signal from the target turning ratio determining means on the basis of a predetermined time constant;

discriminating means for discriminating whether the direction of changing the turning ratio is in the same phase direction or in the reverse phase direction by comparing from the target turning ratio determining means with a signal from the integrating means;

time constant setting means for setting the time constant received from the discriminating means so as to become larger when the directin of changing the turning ratio is in the reverse phase direction rather than when the direction of changing the turning ratio is in the same phase direction;

target turning angle determining means for determining a target turning angle of the rear wheel on the basis of outputs from the integrating means and the turning angle detecting means; and drive controlling means for controlling the actuator so as to become the target turning angle.

* * * * *